United States Patent
Halford

(10) Patent No.: US 12,167,339 B2
(45) Date of Patent: Dec. 10, 2024

(54) VEHICLE TELEMATICS SYSTEM AND A METHOD OF OPERATION

(71) Applicant: JAGUAR LAND ROVER LIMITED, Coventry (GB)

(72) Inventor: Simon Halford, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 16/469,551

(22) PCT Filed: Dec. 6, 2017

(86) PCT No.: PCT/EP2017/081653
§ 371 (c)(1),
(2) Date: Jun. 13, 2019

(87) PCT Pub. No.: WO2018/130344
PCT Pub. Date: Jul. 19, 2018

(65) Prior Publication Data
US 2020/0100185 A1    Mar. 26, 2020

(30) Foreign Application Priority Data
Jan. 16, 2017 (GB) ...................................... 1700696

(51) Int. Cl.
| | | |
|---|---|---|
| *G08C 17/00* | (2006.01) |
| *G07C 5/08* | (2006.01) |
| *H04W 4/48* | (2018.01) |
| *H04W 4/80* | (2018.01) |
| *H04W 52/02* | (2009.01) |
| *H04W 84/12* | (2009.01) |

(52) U.S. Cl.
CPC ........ *H04W 52/0274* (2013.01); *G07C 5/085* (2013.01); *H04W 4/48* (2018.02); *H04W 4/80* (2018.02); *H04W 52/0229* (2013.01); *H04W 52/0254* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 7,596,439 B2 * | 9/2009 | Oesterling | ............. | G07C 5/008 |
| | | | | 702/182 |
| 9,108,525 B2 * | 8/2015 | Przybylski | .............. | B60L 58/15 |
| 9,526,076 B1 | 12/2016 | Park | | |
| 9,527,394 B1 * | 12/2016 | Tang | ..................... | B60W 10/26 |
| 9,840,156 B2 * | 12/2017 | DeBoer, III | ............ | B60L 53/65 |
| 9,913,081 B1 * | 3/2018 | Thanayankizil | ...... | H04L 12/413 |

(Continued)

FOREIGN PATENT DOCUMENTS

| | | |
|---|---|---|
| EP | 1550584 A2 | 7/2005 |
| WO | 2011147893 A1 | 12/2011 |

OTHER PUBLICATIONS

International Search Report and Written Opinion, PCT/EP2017/081653, Mar. 29, 2018.
Search and Examination Report, GB1700696.6, Jun. 21, 2017.

*Primary Examiner* — Stephen M D Agosta
(74) *Attorney, Agent, or Firm* — McCoy Russell LLP

(57) ABSTRACT

A vehicle telematics system including a Wi-Fi module, the telematics system being configured, in dependence on at least one predetermined vehicle condition, to selectively activate or maintain activation of the Wi-Fi module when the vehicle is not in use.

10 Claims, 2 Drawing Sheets

(56) References Cited

U.S. PATENT DOCUMENTS

| | | | |
|---|---|---|---|
| 2010/0161481 A1* | 6/2010 | Littrell | B60L 53/65 705/40 |
| 2010/0162359 A1* | 6/2010 | Casey | H04L 43/106 709/224 |
| 2011/0078092 A1* | 3/2011 | Kim | B60L 53/305 320/109 |
| 2012/0016551 A1* | 1/2012 | Krause | B60W 50/14 701/32.3 |
| 2012/0052873 A1 | 3/2012 | Wong | |
| 2013/0103378 A1* | 4/2013 | Tinnakornsrisuphap | B60L 15/2045 703/18 |
| 2013/0211623 A1* | 8/2013 | Thompson | H04L 67/12 701/1 |
| 2013/0288659 A1* | 10/2013 | Hrabak | H04W 52/0277 455/419 |
| 2013/0316682 A1* | 11/2013 | Vieira | H04L 51/04 455/414.1 |
| 2014/0195140 A1* | 7/2014 | Twarog | G07C 5/0825 701/123 |
| 2014/0244104 A1* | 8/2014 | Tan | H04B 1/3822 701/36 |
| 2014/0244156 A1* | 8/2014 | Magnusson | G01C 21/30 701/418 |
| 2014/0269466 A1* | 9/2014 | Owens | H04W 52/0206 370/311 |
| 2014/0274226 A1 | 9/2014 | Pandya et al. | |
| 2015/0002310 A1* | 1/2015 | Guo | H04W 4/80 340/901 |
| 2015/0116079 A1* | 4/2015 | Mishra | G07C 9/257 340/5.52 |
| 2015/0166007 A1* | 6/2015 | Hong | B60R 25/10 701/2 |
| 2015/0245186 A1* | 8/2015 | Park | H04W 4/16 455/417 |
| 2016/0026659 A1* | 1/2016 | Harley | H04W 4/44 707/758 |
| 2016/0049077 A1* | 2/2016 | Sandbrook | G08G 1/146 340/932.2 |
| 2017/0150531 A1* | 5/2017 | Horbatt | H04W 24/02 |
| 2017/0289758 A1* | 10/2017 | Shiryan | H04W 4/023 |
| 2017/0323356 A1* | 11/2017 | Gharabegian | H04N 7/181 |
| 2018/0025553 A1* | 1/2018 | Bajwa | H04W 4/40 701/32.6 |
| 2018/0158329 A1* | 6/2018 | Benhammou | G08G 1/07 |
| 2018/0264963 A1* | 9/2018 | Dudar | H02J 50/90 |
| 2018/0281612 A1* | 10/2018 | Perry | H04W 4/80 |
| 2018/0289120 A1* | 10/2018 | Gharabegian | A45B 3/04 |
| 2019/0283706 A1* | 9/2019 | Suzuki | G07C 9/00896 |
| 2020/0001736 A1* | 1/2020 | Imai | G07C 5/008 |
| 2020/0262307 A1* | 8/2020 | Rosene | B60L 53/68 |

* cited by examiner

VEHICLE TELEMATICS SYSTEM AND A METHOD OF OPERATION

CROSS-REFERENCE TO RELATED APPLICATIONS

This application is a 371 of International Application No. PCT/EP2017/081653, filed Dec. 6, 2017, which claims priority to GB Patent Application 1700696.6, filed Jan. 16, 2017, the contents of both of which are incorporated by reference herein in their entirety.

TECHNICAL FIELD

The present disclosure relates to a vehicle telematics system and a method of operation. Aspects of the invention relate to a vehicle telematics system, to a vehicle and to a method.

BACKGROUND

A large number of modern vehicles, such as modern motor cars, include at least one telematics system that enables data to be communicated to and from the vehicle. Typically, this data includes vehicle diagnostic information, vehicle status information, as well as data to be used with on board communication and entertainment systems. As such, a telematics system typically includes a number of separate modules that may either be operated independently or in combination. Increasingly, these modules will include one or more communication modules provided for achieving the actual communication of data to and from the vehicle. Examples of such modules include a cellular telecommunications module and a Wi-Fi module.

It is also becoming increasingly desirable for the telematics systems to allow at least some data communication from the vehicle even when the vehicle is not in use. For example, it may be desired for the vehicle to be able to communicate interior temperatures to a vehicle operator, typically using a mobile app, whilst the vehicle is not in use, potentially also with the ability for the user to remotely control the vehicles interior cooling or heating systems. Also, it may be desirable for electrically powered vehicles to be capable of communicating the state of charge of an energy storage means to an owner whilst the vehicle is inactive. However, it is not desirable for the entire telematics system to remain active whilst the vehicle is otherwise not in use, since this is a generally unacceptable demand on the vehicles electrical power supply.

SUMMARY OF THE INVENTION

Aspects and embodiments of the invention provide a vehicle telematics system, a vehicle and a method of operating a vehicle telematics systems as claimed in the appended claims.

According to as aspect of the present invention there is provided a telematics system for a vehicle, including a Wi-Fi module, the telematics system being configured to selectively activate, or maintain in an operative state, the Wi-Fi module when the vehicle is not in use, in dependence on at least one predetermined vehicle condition.

Activating, or maintaining activation, of a Wi-Fi module of the telematics system in response to a particular vehicle condition being met enables data communication to and from the vehicle and when the vehicle is not in use at times that may otherwise not be possible.

When the vehicle is not in use the telematics system may be configured to selectively deactivate, or maintain in an inoperative state, a further telematics module in dependence on at least one predetermined vehicle condition. The at least one predetermined condition may be the same as the predetermined condition in dependence of which the Wi-Fi module is activated, or it may be a different condition. By turning off other telematics modules other than the Wi-Fi module the power requirement to maintain data communication is reduced.

The at least one predetermined vehicle condition may be the availability, or lack of availability, of an alternative communication channel. For example, if the vehicle is in range of a cellular telecommunication network then it may be preferred to maintain data communication using the cellular network and not activate the Wi-Fi module, since the power requirement of the cellular telecommunications systems is generally less.

The at least one predetermined vehicle condition may be that the vehicle is coupled to an electrical power supply. In this instance the power demanded by the Wi-Fi module is not of significance.

The at least one predetermined vehicle condition may be that the telematics system receives a command signal to activate the Wi-Fi module. This permits the Wi-Fi module to be manually activated, for example to enable one or more other features of the vehicle to be demonstrated in the absence of any other communications network being available.

The telematics system may be configured to, on receipt of the command signal, activate the Wi-Fi module for a predetermined period of time.

The at least one predetermined vehicle condition may be that the vehicle is located within range of an authorised Wi-Fi host. If the vehicle has previously been connected to a Wi-Fi host then it is presumed that that Wi-Fi host is trusted by the vehicle operator.

The telematics system may be configured to deactivate the Wi-Fi module if no authorised Wi-Fi host is available. This minimises the likelihood of excessive power drain occurring whilst the Wi-Fi module repeatedly scans for an available Wi-Fi host.

When the Wi-Fi module is in an inoperative state, the telematics system may be configured to periodically activate the Wi-Fi module to check if an authorised Wi-Fi host is available. This therefore allows the Wi-Fi module to potentially connect to a newly discovered Wi-Fi host.

According to another aspect of the present invention there is provided a vehicle comprising a telematics system according to a previous aspect of the current invention.

According to a further aspect of the present invention there is provided a method of operating a telematics system for a vehicle, the telematics system including a Wi-Fi module, the method comprising, selectively activating, or maintaining in an operative state, the Wi-Fi module when the vehicle is not in use, in dependence on at least one predetermined vehicle condition.

The method may include selectively deactivating, or maintaining in an inoperative state, a further telematics module in dependence on at least one predetermined vehicle condition.

The at least one predetermined vehicle condition may comprise the availability of an alternative communication channel.

The at least one predetermined vehicle condition may be that the vehicle is coupled to an electrical power supply.

The at least one predetermined vehicle condition may be that the telematics system receives a command signal to activate the Wi-Fi module.

The method may include that on receipt of the command signal to activate the Wi-Fi module, the Wi-Fi module is activated for a predetermined period of time.

The at least one predetermined vehicle condition may include that the vehicle is located within range of an authorised Wi-Fi host.

The Wi-Fi module may be deactivated if no authorised Wi-Fi host is available. Additionally, when the Wi-Fi module is in an inoperative state, the Wi-Fi module may be periodically activated to check if an authorised Wi-Fi host is available.

According to another aspect of the present invention there is provided a computer program product comprising computer-readable instructions which, when executed on a signal processor of a vehicle cause the signal processor to carry out the method of the preceding aspect of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
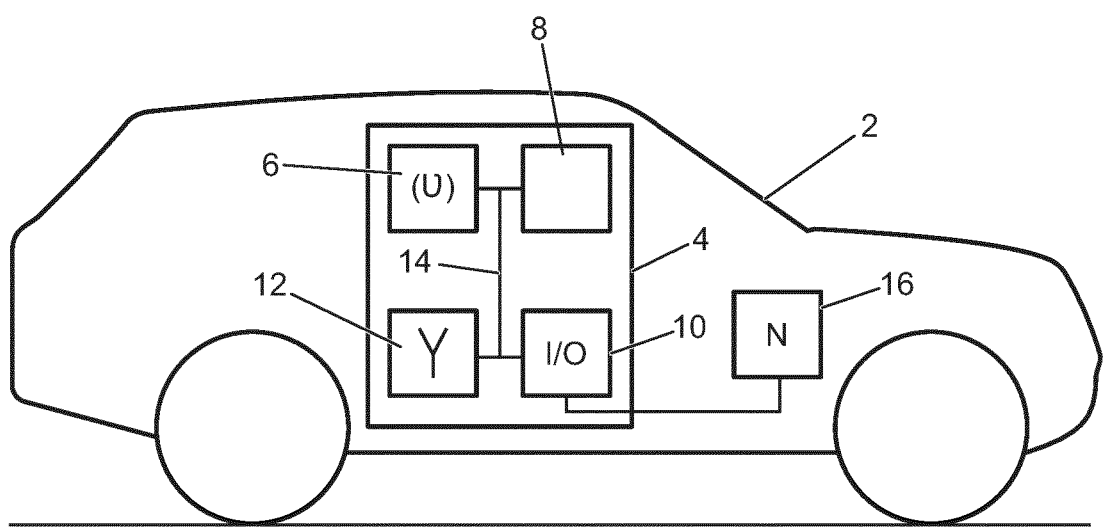
FIG. 1 schematically illustrates a vehicle including a telematics system according to embodiments of the present invention.

FIG. 1 schematically illustrates a vehicle 2 including a telematics system 4. In embodiments of the present invention the telematics system includes a Wi-Fi module 6, a system control module 8, an input/output module 10, and a cellular telecommunications module 12. The individual modules are in communication with one another via a communications bus 14. It will of course be appreciated by those skilled in the art that the telecommunications system may include one or more further modules, and that the functions of the control module 8 and input/output module 10 may also be distributed between the various modules of the telematics system.

The telematics system is configured to monitor the status of one or more predefined vehicle conditions. For example, in embodiments of the present invention the telematics system is configured to detect if the vehicle is connected to an external power supply. This may be achieved by providing a signal to the input/output module 10 from a charging unit 16. The telematics system 4 will also be configured to determine, or receive an indication, that the vehicle is not in use, for example when the vehicle is completely switched off (except any fitted alarm system or other security system) and stationary. When it is detected that the vehicle is not in use the Wi-Fi module 6 is selectively activated, or is maintained in an operative state, such that the Wi-Fi module 6 functions as a Wi-Fi client and connects to an available, authorised, Wi-Fi host, forming a Wi-Fi connection. An example of such a Wi-Fi host may be the vehicle owner's home Wi-Fi network if the vehicle is located at the vehicle owner's home property. The Wi-Fi module 6 is capable of providing data concerning the vehicle status via the Wi-Fi connection.

In some embodiments, when the telematics system determines that the vehicle is not in use and activates, or maintains in an operative state, the Wi-Fi module 6, the system controller 8 also deactivates a number of the remaining system modules such that the power drawn by the active telematics modules is reduced. The number of remaining system modules that are deactivated will vary from vehicle to vehicle but ordinarily will be those modules that are not actively required to maintain the vehicle in its deactivated state. For example, it is expected that the modules required for the vehicle security system will remain active. Additionally, any modules required to support energy charging when the vehicle is coupled to an energy supply will also remain active. Consequently, the number of modules that are deactivated may be any number, but advantageously and depending on the vehicle configuration, the number of modules that are deactivated account for at least half of the total number of modules.

A telematics system, in some embodiments, and as illustrated, may also include a cellular telecommunications module 12. In such circumstances the cellular telecommunications module 12 will be a preferred means of providing a data communication to and from the vehicle when the vehicle is not in use. Consequently, the system controller 8 is configured to only activate the Wi-Fi module 6 when the vehicle is not in use if it is also determined that no data communication via the cellular telecommunications module 12 is available. As an alternative, or in addition to, activating or maintaining in an operative state the Wi-Fi module 6 when the vehicle is connected to an external power supply, the Wi-Fi module 6 may also be activated in response to a command signal being received by the telecommunications system 4. An examples of where a command signal may be issued is at a service location where it is desired to interrogate diagnostic information stored on the vehicle. A further example is when one or more vehicle functions are desired to be demonstrated, for example by a sales or marketing person, without activating the vehicle in a normal manner, such as inside a showroom or exhibition hall. In some embodiments the Wi-Fi module 6 may be activated for only a predetermined period of time to avoid undue power usage. The Wi-Fi module 6 may remain activated indefinitely, if it is detected that an external power supply is providing power to the vehicle 2, either via the charging unit 16, or via other suitable means (not shown).

In some embodiments a check is made to determine if an authorised Wi-Fi host is available for the Wi-Fi module 6 to make a connection with. If no such Wi-Fi host is available then the Wi-Fi module 6 is deactivated, so as to prevent a further reduction in the state of charge of the energy storage means of the vehicle. In some embodiments, the system periodically reactivates the Wi-Fi module 6 to check for Wi-Fi host availability. For example, the Wi-Fi module may be reactivated every 15 minutes, or every hour, or every 4 hours, or once a day, or any other desired time period.

Figure 2:
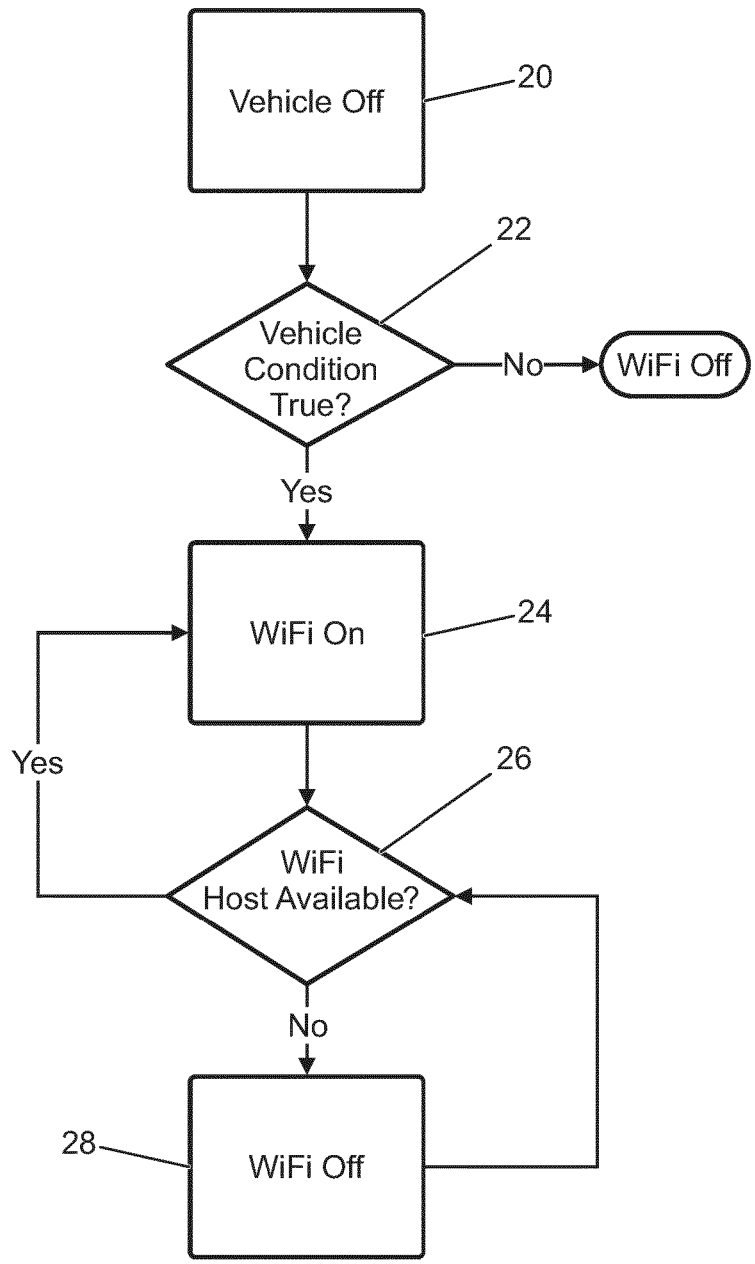
FIG. 2 schematically illustrates a method of operating a vehicle telematics system according to embodiments of the present invention.

FIG. 2 schematically illustrates a method of operating the vehicle telematics system 4 illustrated in FIG. 1 in accordance with embodiments of the present invention. The method commences at step 20, when the vehicle is deactivated, for example, at the end of a journey. Subsequently, at step 22, the telematics system 4 makes a determination as to whether the predetermined vehicle condition is true or false. If it is determined that the vehicle condition is false, i.e. not met, then the Wi-Fi module 6 of the telematics system is deactivated. However, if it is determined that the vehicle condition is true then the Wi-Fi module 6 is activated, or its activation is maintained, as represented at step 24. In some embodiments a further determination is made at step 26, of whether or not an authorised Wi-Fi host is available. If a Wi-Fi host is available, then the Wi-Fi module 6 is maintained in an operative state. However, if there is not an authorised Wi-Fi host available then the Wi-Fi module 6 is deactivated, step 28. In some embodiments, and as illustrated in FIG. 2, step 26, the determination of whether or not a Wi-Fi host is available is repeated at periodic intervals such as every 15 minutes, or every hour, or every 4 hours, or once a day, or any other desired time period.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A telematics system for a vehicle, the telematics system comprising a Wi-Fi module, the telematics system being configured to:
    selectively activate, or maintain in an operative state, the Wi-Fi module when the vehicle is not in use, based at least in part on at least one predetermined vehicle condition, the at least one predetermined vehicle condition including the vehicle being coupled to an external electrical power supply;
    determine whether the vehicle is connected to the external electrical power supply; and
    activate or maintain the Wi-Fi module in the operative state based at least in part on a determination that the vehicle is connected to the external electrical power supply,
    wherein the at least one predetermined vehicle condition comprises the vehicle being located within range of an authorized Wi-Fi host,
    wherein the telematics system is further configured to deactivate the Wi-Fi module if no authorized Wi-Fi host is available, and
    wherein, when the Wi-Fi module is in an inoperative state, the telematics system is configured to periodically activate the Wi-Fi module to check if an authorized Wi-Fi host is available.

2. A telematics system according to claim 1, wherein the telematics system is further configured to selectively deactivate, or maintain in an inoperative state, a further telematics module based at least in part on the at least one predetermined vehicle condition.

3. A telematics system according to claim 1, wherein the at least one predetermined vehicle condition comprises the telematics system receiving a command signal to activate the Wi-Fi module.

4. A telematics system according to claim 3, wherein the telematics system is further configured on, receipt of the command signal, to activate the Wi-Fi module for a predetermined period of time.

5. A vehicle comprising a telematics system according to claim 1.

6. A method of operating a telematics system for a vehicle, the telematics system including a Wi-Fi module, the method comprising:
    selectively activating, or maintaining in an operative state, the Wi-Fi module when the vehicle is not in use, based at least in part on at least one predetermined vehicle condition, the at least one predetermined vehicle condition including the vehicle being coupled to an external electrical power supply, wherein the at least one predetermined vehicle condition comprises the vehicle being located within range of an authorized Wi-Fi host;
    determining whether the vehicle is connected to the external electrical power supply;
    activating or maintaining the Wi-Fi module in the operative state based at least in part on a determination that the vehicle is connected to the external electrical power supply,
    deactivating the Wi-Fi module if no authorized Wi-Fi host is available, and
    when the Wi-Fi module is in an inoperative state, periodically activating the Wi-Fi module to check if an authorized Wi-Fi host is available.

7. A method according to claim 6, further comprising selectively deactivating, or maintaining in an inoperative state, another telematics module based at least in part on at least one predetermined vehicle condition.

8. A method according to claim 6, wherein the at least one predetermined vehicle condition comprises the telematics system receiving a command signal to activate the Wi-Fi module.

9. A method according to claim 8, wherein, on receipt of the command signal, the Wi-Fi module is activated for a predetermined period of time.

10. A non-transitory computer program product comprising computer-readable instructions which, when executed by a signal processor of a vehicle, cause the signal processor to carry out the method of claim 6.

* * * * *